Dec. 19, 1967  F. E. JENSEN  3,358,977
ROTARY KILN INSTALLATIONS
Filed Aug. 5, 1965  2 Sheets-Sheet 1
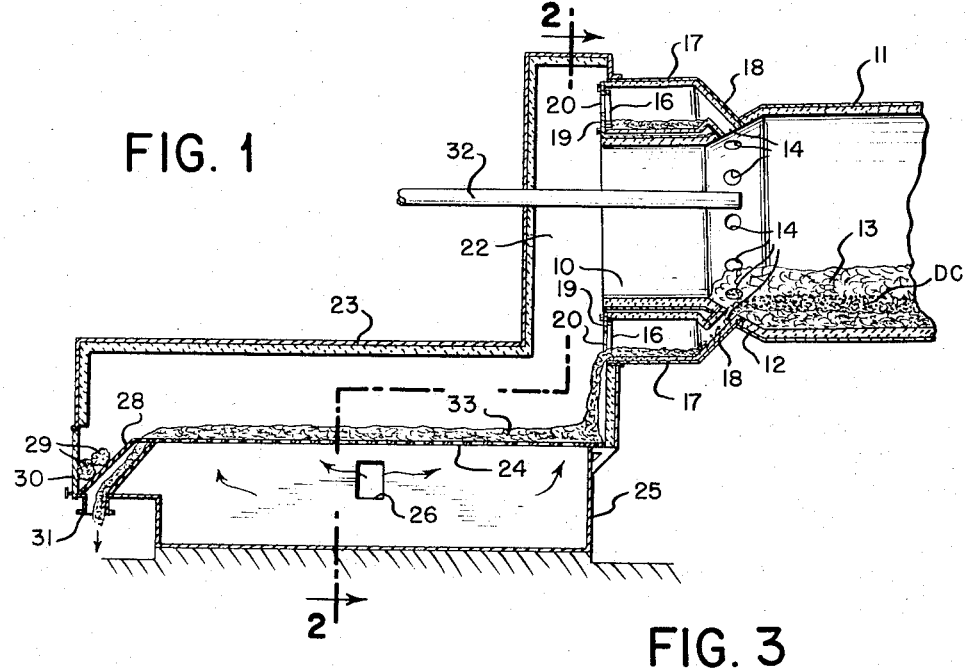
FIG. 1
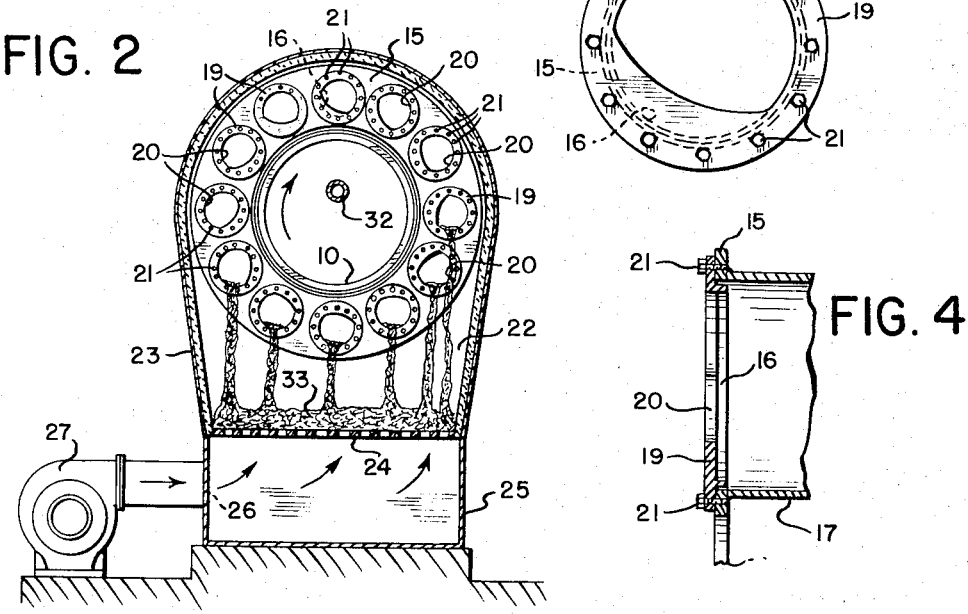
FIG. 2
FIG. 3
FIG. 4
INVENTOR
Flemming Edvin Jensen
BY
Pennie Edmonds Morton Taylor Adams
ATTORNEYS Dec. 19, 1967        F. E. JENSEN        3,358,977
ROTARY KILN INSTALLATIONS
Filed Aug. 5, 1965        2 Sheets-Sheet 2

INVENTOR
Hemming Edvin Jensen
BY
Pennie Edmonds Morton Taylor & Adams
ATTORNEYS

United States Patent Office 3,358,977
Patented Dec. 19, 1967

3,358,977
ROTARY KILN INSTALLATIONS
Flemming Edvin Jensen, Copenhagen-Valby, Denmark, assignor to F. L. Smidth & Co., New York, N.Y., a corporation of Delaware
Filed Aug. 5, 1965, Ser. No. 477,365
9 Claims. (Cl. 263—32)

ABSTRACT OF THE DISCLOSURE

The improved installations of the invention are directed toward obtaining a more even distribution in a bed of burned material deposited on the grate cooler by spreading the burned material directly from the kiln onto the grate cooler and preventing the dust particles and lumps of burned material from accumulating in a relatively small central core within the bed of material.

---

This invention relates to installations which are employed for the production of cement clinker, burned lime, sintered ores, and like materials and include a rotary kiln and a grate cooler receiving material from the kiln and cooling the material by passing air through it. More particularly, the invention is concerned with a novel installation of the type referred to which provides more satisfactory cooling of the material than is obtainable in prior similar installations. The improved results are obtained in the installation of the invention because the burned material is more evenly distributed in a bed on the grate and dust particles leaving the kiln with the larger lumps of burned material are prevented from accumulating in a relatively small central core within the bed of material.

In conventional installations including a rotary kiln and a grate cooler, the kiln is mounted at a low angle to the horizontal with the grate below its lower end and, as the kiln rotates, the burned material is discharged in a continuous stream from a short arc of the kiln offset in the direction of rotation from the lowest point of the outlet end of the kiln. The falling material collects on the grate in a pile having a high point at the bottom of the falling stream and, as the material is carried away, a bed, which is much thicker at the middle than at its sides, is formed upon the grate. In its passage through the bed, the cooling air takes the path of least resistance through the thinner side parts of the bed and the result is non-uniform cooling.

Another factor contributing to the non-uniform cooling of the material is the presence of dust particles unevenly distributed through the bed undergoing cooling. As the charge of material moves down through the kiln during the burning operation, the rotation of the kiln causes the lumps of material in the charge to roll down the sloping surface of the kiln lining. The fine particles or dust in the charge are not able to roll and, as a consequence, the dust gathers within the charge in the form of a longitudinal core and is present as such a core in the stream of material being discharged from the kiln upon the grate. In the charge, the dust core lies approximately centrally within the charge so that, when the material is deposited on the grate, the dust forms a central longitudinal core or wall within the bed to be cooled. The core of dust offers great resistance to the passage of the cooling air and contributes further to the non-uniform cooling.

The installation of the invention overcomes the objectionable features of prior similar installations and provides more uniform cooling of the material. In the new installation, the kiln is provided with reservoirs arranged at its lower discharge end in a circumferential series and in communication with the interior of the kiln through openings in the kiln shell. During each rotation of the kiln, each reservoir receives burned material from the kiln and discharges material across the grate as the reservoir moves through the bottom arc of kiln rotation. The material entering each reservoir includes a part of the dust core in the kiln charge and, before the material is discharged from the reservoir, the kiln makes at least one rotation during which the material within the reservoir is thoroughly mixed. The reservoirs are of such size that the material entering a reservoir does not remain in the reservoir sufficiently long to form a dust core. Accordingly, as the material is discharged from a reservoir during the movement of the reservoir across the grate, the dust is similarly distributed across the grate and the formation of a core or wall of dust on the grate is avoided.

For a better understanding of the invention, reference may be made to the accompanying drawing, in which FIG. 1 is a vertical longitudinal sectional view of a kiln-cooler installation of the invention;

FIG. 2 is a sectional view on the line 2—2 of FIG. 1;

FIG. 3 is an end view of the closure plate at the discharge end of one of the reservoirs of the kiln of FIG. 1;

FIG. 4 is a fragmentary sectional view of the parts shown in FIG. 3;

Figure 5:
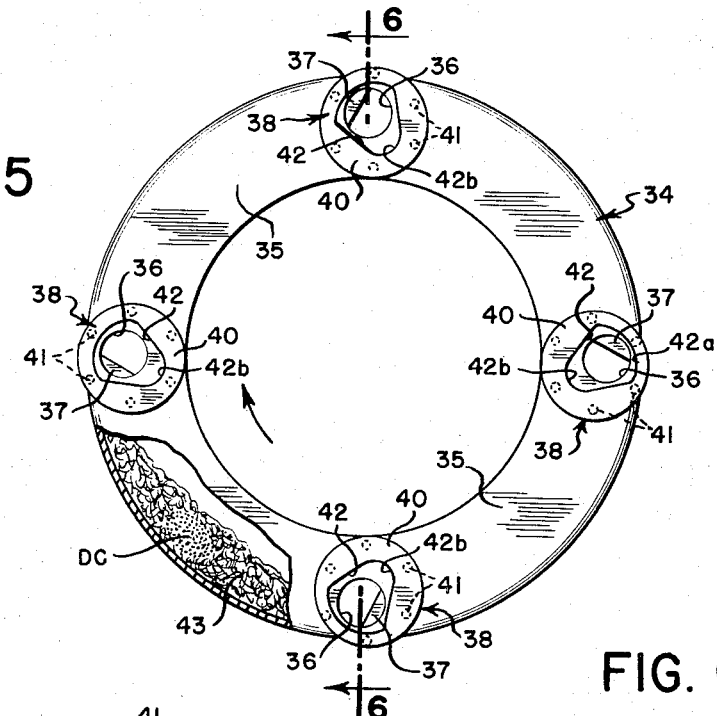
FIG. 5 is a view in elevation of the outlet end of another form of rotary kiln which may be used in an installation of the invention.

The kiln-cooler installation shown in FIG. 1 includes a kiln having a discharge end section 10 of less diameter than the main body 11 of the kiln and connected thereto by a frusto-conical section 12, the sections all having the usual lining. The connecting section 12 acts as a dam ring against which the charge 13 of material in the kiln accumulates and a circumferential series of discharge openings 14 are formed through section 12 and its lining. In the kiln illustrated, there are 12 such openings but more or less openings may be provided.

A flat ring 15 is mounted to encircle the kiln section 10 at its outer end and the ring is formed with openings 16 aligned with respective openings 14 lengthwise of the kiln. A reservoir 17 is mounted on the ring 15 to encircle each opening 16 and each reservoir has a neck 18 of reduced diameter which extends at an angle to the axis of the reservoir and is secured to the section 12 to surround one of the openings 14. The openings 16 in the ring 15 are of circular form and plates 19 having a non-circular opening 20 are mounted on the ring 15 to act as partial closures for respective openings 16. Each plate 19 is secured to the outer face of ring 15 by a series of bolts 21, so that the plate may be secured in place in different angular positions in relation to the axis of the associated reservoir.

The kiln is mounted at a low angle and its end section 10 and the ring 15 lie within an opening in a vertical shaft 22 forming part of the casing of a cooler 23. The casing encloses a transversely horizontal grate 24, which may be of the traveling type or be provided with reciprocating conveying elements, and the cooler includes a casing 25 below the grate, to which air under pressure is supplied through an opening 26 by a fan 27. At the end of the grate remote from the shaft 22, the cooler is provided with a set of inclined grate bars 28 holding back oversized lumps 29 which collect at the lower ends of bars and may be removed through a door 30. The material passing between the bars leaves the cooler chamber through a chute 31.

In the operation of the installation shown in FIG. 1, the charge of material to be burned is introduced into the kiln at the upper end and is preheated and then burned by heat produced by the burning of fuel supplied through a conventional burner pipe 32 extending through the shaft 22 and projecting into the lower end of the kiln. As a result of the rotation of the kiln, the charge assumes a position offset from the bottom arc of the kiln in the direction of rotation and the dust particles collect to form a dust core DC which extends longitudinally through the charge. The charge is held back by the connecting section 12 of the kiln and, as each of the openings 14 through the wall of the section passes beneath the charge, a quantity of material enters the neck 18 leading from the opening and travels through the neck into the associated reservoir 17. The part of the charge thus entering each reservoir includes a proportion of dust from the dust core and, as the rotation of the kiln continues, the material in each reservoir travels through it with a movement similar to the movement of the charge through the kiln. The reservoirs are of such length that the material entering the reservoir is retained in the reservoir through at least one revolution of the kiln but not long enough for the formation of a dust core within the material.

As a reservoir moves through the lower half of its path of travel, material from the reservoir begins to be discharged through the opening 20 in the closure plate 19 of the reservoir and the discharge of material through the opening continues as the reservoir travels across the grate from one side to the other. The proper distribution of material on the grate depends on the orientation of the discharge openings 20 through the closure plates 19 and the plates can be angularly adjusted to place the discharge openings in position to insure the desired discharge of material across the grate. The distribution of the material on the grate through the discharge opening of a reservoir traveling across the grate produces a bed 33 of material, which is of substantially uniform thickness from side to side and contains dust distributed therethrough and not concentrated to form a longitudinal core or wall. Since a circle enclosing and tangent the reservoirs may be of greater diameter than the kiln, the use of the reservoirs makes it possible to employ a grate wider than that used with the kiln of the same diameter not provided with the reservoirs, and the width of the grate may be varied by varying the length of the necks 18. Use of a wider grate permits acceleration of the cooling.

Figure 7:
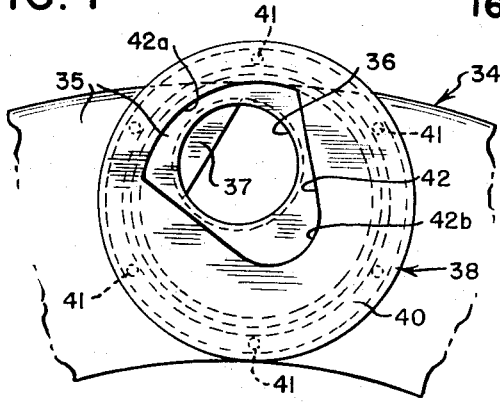
FIG. 7 is a fragmentary end elevational view on an enlarged scale of one of the reservoirs shown in FIG. 5.
Figure 8:
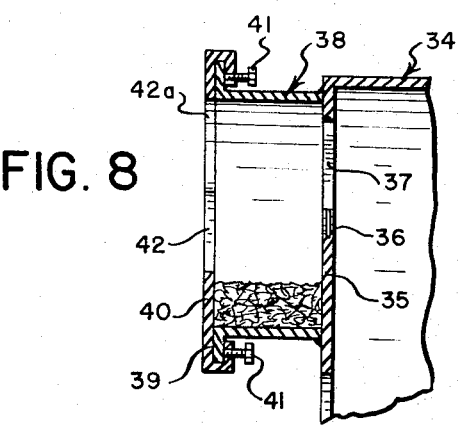
FIG. 8 is a longitudinal sectional view through the reservoir of FIG. 7.
Figure 6:
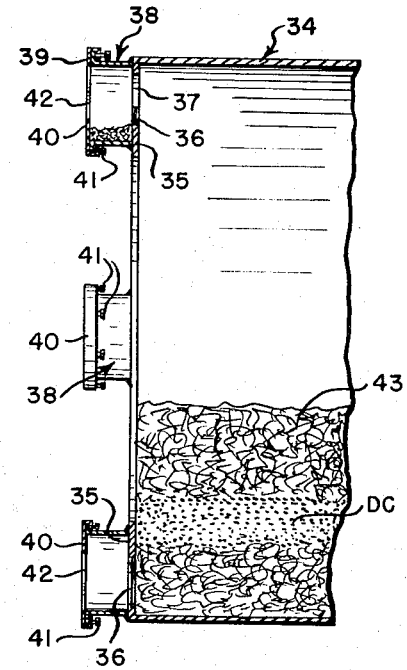
FIG. 6 is a sectional view on the line 6—6 of FIG. 5.

In the construction shown in FIGS. 5–8, inclusive, the kiln 34 is illustrated diagrammatically and with the lining omitted. At its lower end, the kiln shell is provided with an internal flange 35 serving as a dam ring and a series of circular openings 36, shown as four in number, are formed through the ring. A plate 37 having the form of a segment of a circle is mounted in each of the openings 36 and can be adjusted angularly in the opening. A cylindrical reservoir 38 is mounted on the outer face of the plate 35 to encircle each of the openings 36 and, at its outer end, each reservoir is provided with a radial flange 39, on which is mounted a closure plate 40 held in place by bolts 41 and angularly adjustable. Each plate has an opening 42 which is somewhat triangular but has an arcuate base 42a and a rounded apex 42b.

The kiln 34 with the reservoirs 38 is employed with a grate cooler of the type shown in FIG. 1 and, in the operation of the installation including the kiln, the charge 43 of material traveling through the kiln accumulates against the inner side of the dam ring 35 and lies offset in the direction of kiln rotation from the bottom of the kiln. As the kiln rotates, the inlet openings 36 through the dam ring moves successively across the end of the charge and a quantity of the charge enters each reservoir through its inlet opening. In the charge in the kiln, the dust forms a longitudinal core DC (FIG. 1) and, as a quantity of the core enters a reservoir, a part of the dust core goes with it. The quantity of material and dust entering a reservoir depends on the shape and orientation of the entrance opening 36 as determined by the size and position of the plate 37 and that shape can be varied by angular adjustment of the plate 37 in the opening. The material and dust entering each reservoir move through the reservoir as the kiln rotates but are retained therein through at least one rotation of the kiln. When the material in the reservoir reaches the closure plate 40, no discharge takes place until the reservoir begins to move downward into the bottom arc of its path of travel. During the movement of the reservoir through that arc, the material is discharged through the opening 42 and the material begins to fall upon the grate 24 at one side of the grate. The time, at which the discharge starts, is determined by the angular adjustment of the plate 40 and the discharge continues as the reservoir moves across the grate. The travel of material through a reservoir is completed before the dust in the material can collect and form a core and the discharge of material from the traveling reservoir results in the deposit on the grate of a bed of uniform thickness through which the dust is distributed.

I claim:

1. A kiln installation which comprises a rotary kiln supported at an angle to the horizontal and having a central opening in its lower end for intake of air and a plurality of material outlet openings in a circumferential series at its lower end, a stationary casing in communication with the interior of the kiln through its central opening, a transversely horizontal grate inside the casing, means for depositing material issuing through the kiln outlet openings upon the grate to form a bed of substantially uniform thickness across the grate, the depositing means including reservoirs mounted on the kiln to extend lengthwise thereof and connected at one end to respective outlet openings to receive material through the openings and means partially closing the other end of each reservoir and defining a discharge opening for directly discharging material into the casing to fall upon the grate as the kiln rotates, means for advancing the bed, and means for passing air through the grate from beneath to cool the material in the bed and heat the air.

2. The kiln installation of claim 1, in which the partial closing means for each reservoir defines a non-circular discharge opening and is adjustable to vary the orientation of the opening in relation to the axis of the reservoir.

3. The kiln installation of claim 1, in which the partial closing means includes a plate with a non-circular opening forming the discharge opening of the reservoir and means for securing the plate in different angular positions at the end of the reservoir.

4. The kiln installation of claim 1, in which each kiln outlet opening is non-circular and is defined in part by an angularly adjustable plate.

5. The kiln installation of claim 1, in which the reservoirs have the form of a body of revolution.

6. The kiln installation of claim 5, in which the reservoirs are cylindrical.

7. The kiln installation of claim 5, in which the axes of the reservoirs are parallel to the axis of the kiln.

8. The kiln installation of claim 1, in which the kiln has an internal flange forming a dam ring at its lower end, the material outlet openings are formed in the dam ring, and the reservoirs are attached to the dam ring to encircle respective outlet openings.

9. The kiln installation of claim 1, in which the material outlet openings are formed in the kiln shell at a distance from its lower end and each reservoir has a neck attached to the outer surface of the shell around one of the openings, the neck extending outward from the shell.

References Cited

UNITED STATES PATENTS

| | | | |
|---|---|---|---|
| 1,510,140 | 9/1924 | Fasting | 263—32 |
| 1,690,048 | 10/1928 | Bentley | 263—32 |
| 1,830,959 | 11/1931 | Petersen | 263—32 |
| 2,136,174 | 11/1938 | Vogel-Jorgensen | 263—32 |

FREDERICK L. MATTESON, JR., *Primary Examiner.*

JOHN J. CAMBY, *Examiner.*